United States Patent
Marymor et al.

[11] Patent Number: 5,971,452
[45] Date of Patent: Oct. 26, 1999

[54] HAND TOOL FOR COLLECTING ANIMAL DROPPINGS

[76] Inventors: Neil S. Marymor; Jonathan G. Marymor; Bonnie G. Marymor; Blake G. Marymor; Alexa G. Marymor, all of 51 Allandale Rd., Wynnewood, Pa. 19096

[21] Appl. No.: 09/251,797

[22] Filed: Feb. 17, 1999

Related U.S. Application Data

[60] Provisional application No. 60/096,883, Aug. 17, 1998.
[51] Int. Cl.⁶ .............................. A01K 29/00; E01H 1/12
[52] U.S. Cl. ................................................................ 294/1.5
[58] Field of Search .............................. 294/1.1, 1.3–1.5, 294/55; 15/104.8, 257.1, 257.3, 257.4, 257.5, 257.8; 248/95, 99–101

[56] References Cited

U.S. PATENT DOCUMENTS

| | | | |
|---|---|---|---|
| 4,852,924 | 8/1989 | Ines | 294/1.5 |
| 5,269,575 | 12/1993 | Parvaresh | 294/1.5 |
| 5,676,411 | 10/1997 | Kwok | 294/1.5 |
| 5,683,129 | 11/1997 | Jensen | 294/1.5 |

FOREIGN PATENT DOCUMENTS

| | | | |
|---|---|---|---|
| 2559-350 | 8/1985 | France | 294/1.5 |
| 3811-273 | 10/1989 | Germany | 294/1.5 |

Primary Examiner—Dean J. Kramer

[57] ABSTRACT

A unique, one piece, hand-held, portable pet stool collection device that consists of an ergonomically designed handle attached to an elliptically shaped ring. The ring accommodates the placement of an ordinary plastic bag, with handles, to be used as a receptacle for waste. The waste does not contaminate the ring or user and is therefore, hygienic. This device has no moving parts, it is easy to use, efficient, and economical. Most importantly, by retrieving waste prior to contamination with the ground, the device is environmentally responsible. This device may be used in day or night time conditions and in varied terrain such as pavement, grass, or shrub areas. The ergonomic handle allows the user (standing or in wheelchair) to place the ring and bag near the ground positioned to receive, directly, the dog's waste. The bag is then removed, tied and disposed of properly without waste touching one's hands.

1 Claim, 2 Drawing Sheets

HAND TOOL FOR COLLECTING ANIMAL DROPPINGS

This application claims the benefit of U.S. Provisional Application No. 60/096,883 filed on Aug. 17, 1998.

FIELD OF INVENTION

This invention relates to hand held, receptacle type tool, that allows for the collection of animal waste in a hygienic manner.

BACKGROUND—PRIOR ART

Having had many dogs over the years, I have never found an efficient and hygienic device to aide in retrieving solid waste from the dog. All too often, dog waste can be found littering the streets, sidewalks, playgrounds, parks, and even on one's private property. We believe that this problem is becoming more widespread as the pet population is booming. It is our opinion that this is the case because pet owners find it distasteful to scoop up or shovel solid waste into a bag or other receptacle. We have made countless trips to the pet stores in search of the perfect waste retrieval system. To date, we have only found devices that scoop with a bivalve rake and bin mechanism or bags with a cardboard edge enabling one to scoop the waste that has already hit the ground. Also, there are those bags that one places his hand into and retrieves the stool manually in this inverted bag technique. These methods of waste collection are time consuming, cumbersome, inefficient, and most of all allow the ground to be contaminated with waste since the waste is deposited directly to ground and then removed. Therefore, these systems will likely leave residue on the ground and possibly on one's hand while trying to scoop the waste.

Currently, we own a Mastiff weighing approximately 185 pounds, As he has grown, so have the size of his stools. Over the past three years that we have owned this dog, we have finally developed a one piece system for waste retrieval that is easy to use, efficient, not embarrassing for the dog walker to use, and eliminates the problem of stool touching the ground before the stool is retrieved. This device is placed beneath the squatting dog as he defecates, thereby, retrieving the stool directly.

Since we have developed our prototype, we have researched whether other devices such as this have been designed as we have never seen one in a pet supply store. We have found that other devices have been designed such as Cassidy's U.S. Pat. No. 3,872,831, Travis' U.S. Pat. No. 4,012,067, Pezzino's U.S. Pat. No. 3,786,779, Hemans' U.S. Pat. No. 4,958,871, Ines' U.S. Pat. No. 4,852,924, Kwok's U.S. Pat. No. 5,676,411, and Jensen's U.S. Pat. No. 5,683,129. However, each of these devices are complicated by the design of multiple parts that in some way are mechanical and, in our opinion, make these designs impractical for consistent daily use. Our device is simple in design, environmentally responsible, economic making this device one that one will happily use while walking one's dog. Our device will improve compliance with laws that mandate the removal of waste and help to foster a better relationship between pet owners and the rest of the community.

BRIEF DESCRIPTION OF DRAWINGS

The hand held stool collection device is illustrated in the accompanying drawings showing.

Reference Numerals on Drawings

1—handle-ring one piece joined construction
2—notch incorporated into ring
3—peg extending below surface of ring
4—offset point of handle contributing to ergonomic design
5—typical handle type bag
6—bag in position, closed end beneath ring
7—one handle end of bag secured around peg in figure of eight fashion
8—one handle end of bag secured through notch in ring
9—bag opening draped over ring
10—scalloped portion of grip
11—convex portion of grip
12—thumb rest portion of grip

DESCRIPTION OF THE PREFERRED EMBODIMENT

Figure 1:
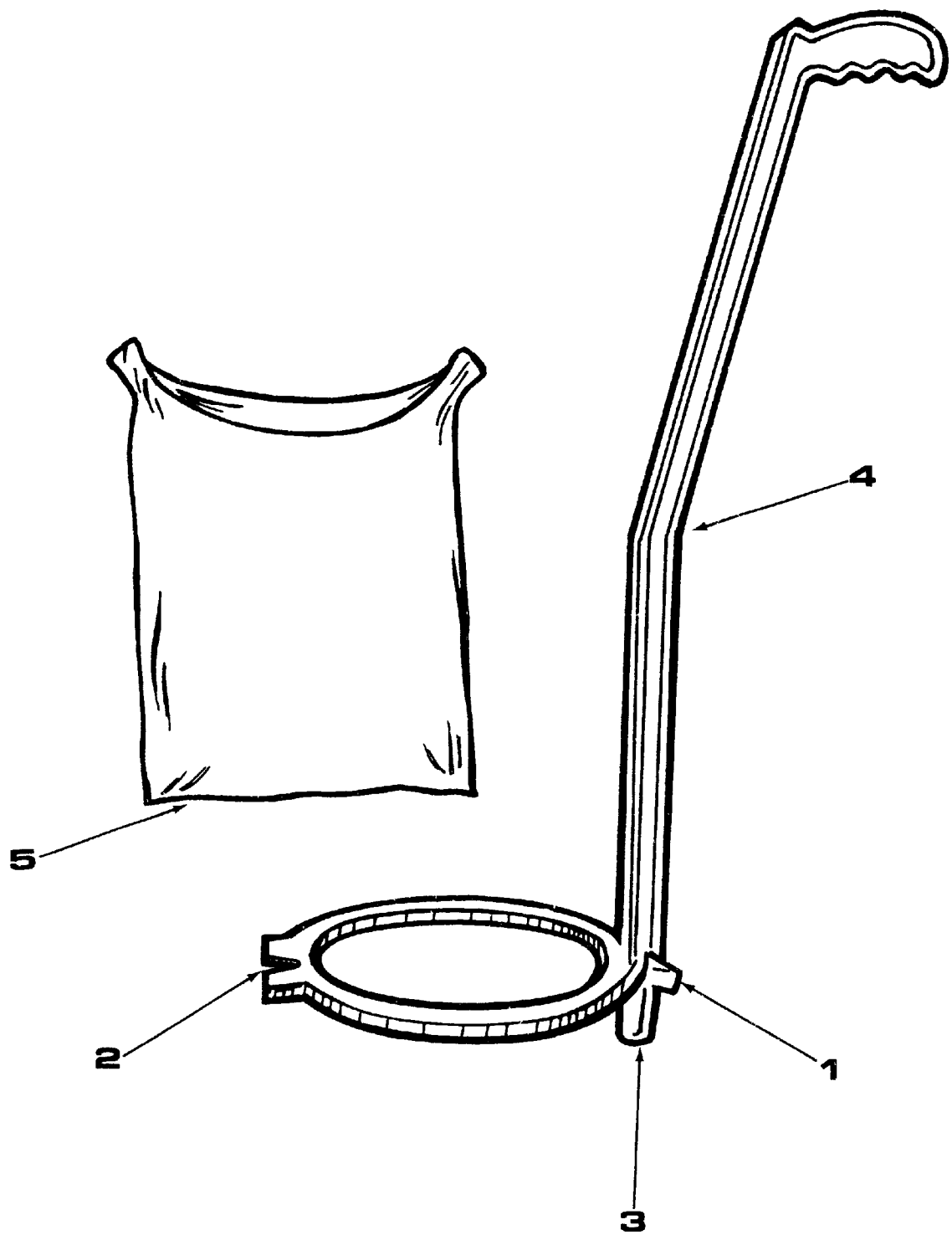
FIG. 1. shows the overall perspective of the device illustrating the ergonomic handle design attached in a one piece fashion to the elliptical ring that is made with a notch to allow for anchoring of one handled portion of a bag and 180 degrees opposed is the peg extension that anchors the other handled portion of the bag. This figure shows the device without the bag in place, but does illustrate the type of bag that may be utilized.
Figure 2:
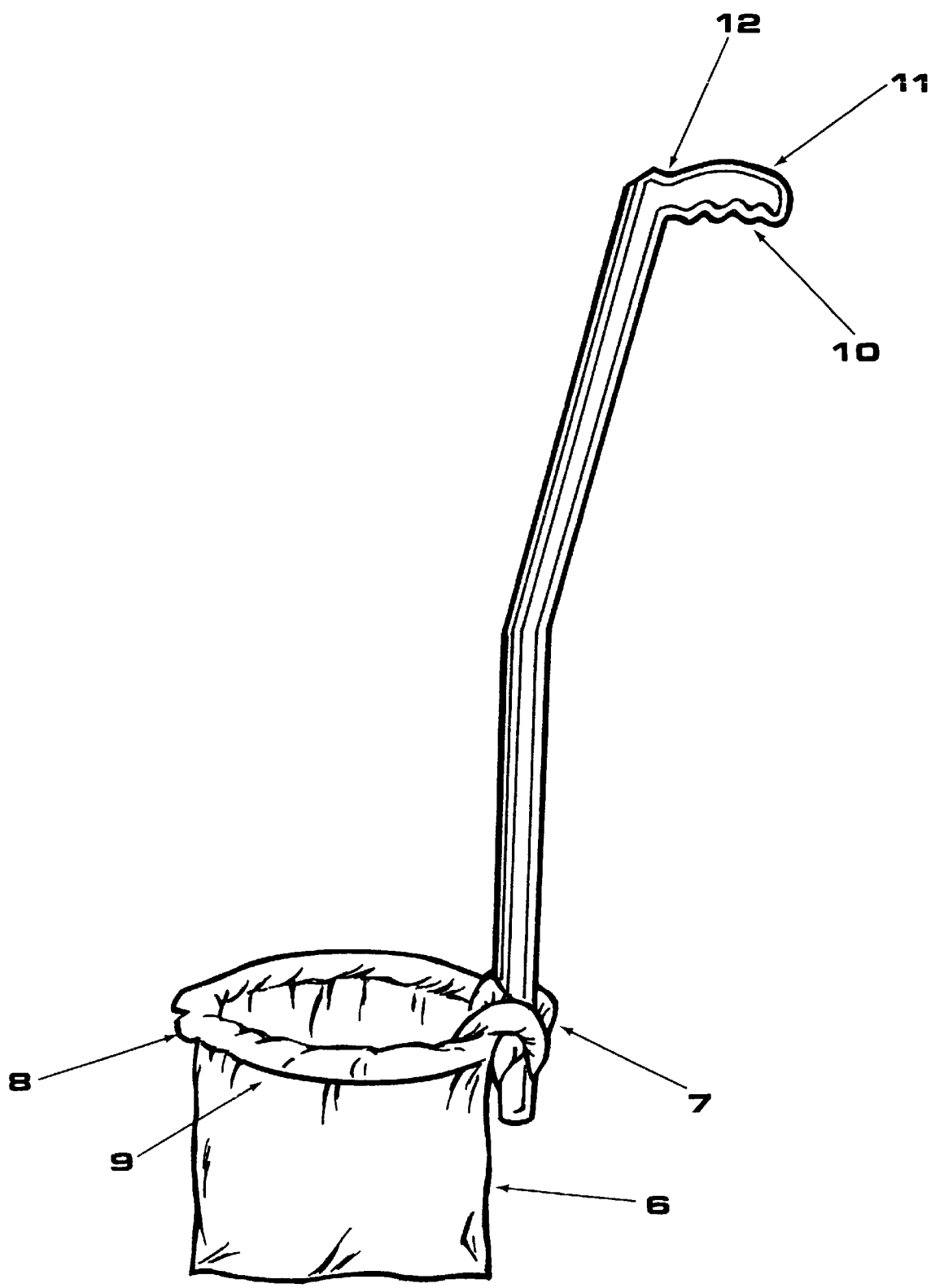
FIG. 2. shows an overall perspective with the bag in place revealing the method in which the bag is draped over the ring, then anchoring one handled end in a figure of eight fashion over the peg and then drawing the other handled end into the notch to hold the bag snugly in place over the ring. In addition, the "pistol-grip" handle is further detailed showing the scalloped depressions for fingertip placement as well as the convex contour for the palm and the slight dip and elevation positioned as a thumb rest.

A typical embodiment of our invention is shown in the attached drawings, FIG. 1 (overall perspective without bag attached) and FIG. 2 (overall perspective with bag attached). The device is assembled as a one piece device constructed of a dense plastic material. The elliptical ring (#1) is approximately 27 centimeters in its long axis and approximately 23 centimeters in its short axis. The ring has two flared ends. One is located at the handle insertion and one located 180 degrees opposed where the notch is incorporated. The notch (#2), measuring approximately one millimeter, serves as a locking and adjustment aid for the bag as the bag is draped over the ring. Extending beneath the ring undersuface, and 180 degrees opposed to the notch, a peg (#3), approximately five centimeters, is located to allow the bag (#6) to be anchored. Once the bag is anchored about the peg (#7), the bag can then be drawn tight over the ring and secured into the notch (#8). The handle is attached to the ring directly over the peg. The handle length is approximately 70 centimeters. The handle is distracted from the perpendicular approximately 10 degrees (#4) allowing for accurate and comfortable placement of the ring beneath the dog. The handle grip is like a "pistol-grip" design with curved depressions (#10) allowing for a comfortable fit of the palmar surface of the grasping fingers. Also, the superior portion of the grip is curved, in a convex manner (#11) to allow for a comfortable fit to the palm of the hand. Lastly, the grip shows a slight dip and then elevation (#12) providing a comfortable resting location for the thumb.

In consideration of the above, we claim:

1. A one piece pet stool collection device that consists of an ergonomically designed handle connected to an elliptically designed ring that accommodates a plastic bag, with handles, that serves as a receptacle for solid dog waste is comprised of the following:

a. a plastic ring that is joined to a plastic handle in perpendicular fashion;
b. with the handle angled in its midsection to distract the user from the ring which remains parallel to the ground during use;
c. with the ring not flush to the ground but elevated by the length of a short peg that extends below the undersurface of the ring;
d. with the peg functioning as an anchor for one part of the bag;
e. with the peg capable as functioning as a pivot point at the end of a cane or walking stick;
f. with the ring having a notch 180 degrees from the peg functioning
f. as the other anchoring and adjustment location as the bag is draped over the ring and then drawn tight through the notch;
g. with the device remaining clean as the bag covers the ring during usage;
h. and the one piece design eliminates the chance for malfunction.

* * * * *